(12) United States Patent
Wang et al.

(10) Patent No.: US 10,395,094 B2
(45) Date of Patent: Aug. 27, 2019

(54) METHOD AND APPARATUS FOR DETECTING GLASSES IN A FACE IMAGE

(71) Applicant: Tencent Technology (Shenzhen) Company Limited, Shenzhen (CN)

(72) Inventors: Chengjie Wang, Shenzhen (CN); Guofu Tan, Shenzhen (CN); Hui Ni, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 74 days.

(21) Appl. No.: 15/696,016

(22) Filed: Sep. 5, 2017

(65) Prior Publication Data

US 2017/0364738 A1 Dec. 21, 2017

Related U.S. Application Data

(63) Continuation-in-part of application No. PCT/CN2016/107178, filed on Nov. 25, 2016.

(30) Foreign Application Priority Data

Nov. 25, 2015 (CN) .......................... 2015 1 0833176

(51) Int. Cl.
*G06K 9/00* (2006.01)
*G06T 7/73* (2017.01)
(Continued)

(52) U.S. Cl.
CPC ..... *G06K 9/00228* (2013.01); *G06K 9/00281* (2013.01); *G06K 9/6202* (2013.01);
(Continued)

(58) Field of Classification Search
CPC ........... G06K 9/00228; G06K 9/00248; G06K 9/00281; G06K 9/00275; G06K 9/00295;
(Continued)

(56) References Cited

U.S. PATENT DOCUMENTS

| 10,169,646 B2 * | 1/2019 | Ganong | ............. G06K 9/00677 |
| 2006/0193515 A1 * | 8/2006 | Kim | ................... G06K 9/00228 382/173 |

(Continued)

FOREIGN PATENT DOCUMENTS

| CN | 1606029 A | 4/2005 |
| CN | 102163288 A | 8/2011 |

(Continued)

OTHER PUBLICATIONS

Gunduz H., Halepmollasi R., Sinana O., "Glasses Detection in Face Images using Histogram of Oriented Gradients", 2014 IEEE 22nd Signal Processing and Communications Applications Conference (SIU), 2014, pp. 1889-1892.*

(Continued)

*Primary Examiner* — Jose L Couso
(74) *Attorney, Agent, or Firm* — Morgan, Lewis & Bockius LLP

(57) ABSTRACT

This application discloses a method and a terminal for detecting glasses in a face image. The method includes: obtaining a face image; determining a nose bridge region in the face image; detecting an image change in the nose bridge region to obtain an image change result of the nose bridge region; and determining whether there are glasses in the face image according to the image change result of the nose bridge region. The terminal for detecting glasses in a face image matches the method.

9 Claims, 5 Drawing Sheets

(51) Int. Cl.
- *G06T 7/33* (2017.01)
- *G06T 7/90* (2017.01)
- *G06K 9/62* (2006.01)

(52) U.S. Cl.
CPC ............... *G06T 7/337* (2017.01); *G06T 7/74* (2017.01); *G06T 7/90* (2017.01); *G06K 9/00288* (2013.01); *G06K 9/6256* (2013.01); *G06T 2207/10024* (2013.01); *G06T 2207/30201* (2013.01)

(58) Field of Classification Search
CPC ........... G06K 9/00268; G06K 9/00221; G06K 9/00308; G06K 9/00604; G06K 9/00624; G06K 9/0061; G06K 9/00771; G06K 9/00845; G06K 9/00906; G06K 9/6202; G06K 2009/00322; G06T 7/74; G06T 7/75; G06T 7/73; G06T 7/337; G06T 7/90; G06T 7/11; G06T 7/149; G06T 7/20; G06T 7/77; G06T 11/00; G06T 11/80; G06T 19/20; G06T 2200/04; G06T 2207/10016; G06T 2207/30201; G06T 2207/30268; G06T 2207/10012; G06T 2207/30241; H04N 2213/008; H04N 13/239; G06F 3/013

See application file for complete search history.

(56) References Cited

U.S. PATENT DOCUMENTS

| | | | |
|---|---|---|---|
| 2007/0177793 A1* | 8/2007 | Gu | G06K 9/00281 382/159 |
| 2007/0177794 A1* | 8/2007 | Gu | G06K 9/00281 382/160 |
| 2009/0087038 A1* | 4/2009 | Okada | G06K 9/00268 382/118 |
| 2011/0052013 A1 | 3/2011 | Sasahara et al. | |
| 2011/0091071 A1* | 4/2011 | Sabe | G06K 9/00281 382/103 |
| 2014/0205143 A1* | 7/2014 | Zhang | G06K 9/00845 382/103 |
| 2016/0253550 A1* | 9/2016 | Zhang | G06K 9/00604 382/203 |
| 2016/0328610 A1* | 11/2016 | Thompson | G06K 9/00469 |
| 2017/0262695 A1* | 9/2017 | Ahmed | G06K 9/00288 |
| 2018/0197273 A1* | 7/2018 | Hung | G06K 9/00268 |
| 2018/0285630 A1* | 10/2018 | Han | G06K 9/00255 |
| 2018/0352150 A1* | 12/2018 | Purwar | G06K 9/00248 |
| 2019/0080149 A1* | 3/2019 | Gernoth | G06K 9/00255 |

FOREIGN PATENT DOCUMENTS

| | | | |
|---|---|---|---|
| CN | 103093215 A | * | 5/2013 |
| CN | 103093215 A | | 5/2013 |
| CN | 103425970 A | | 12/2013 |
| CN | 103714321 A | | 4/2014 |
| CN | 103927520 A | | 7/2014 |
| CN | 103942527 A | | 7/2014 |
| CN | 104463128 A | | 3/2015 |

OTHER PUBLICATIONS

Jiang X., Binkert M., Achermann B., "Towards detection of glasses in facial images", Pattern Analysis & Applications vol. 3, 2000, pp. 9-18.*

Jing Z., Mariani R., "Glasses detection and extraction by deformable contour", IEEE Pattern Recognition Proceedings 15th International Conference vol. 2, 2000 pp. 933-936.*

Wu C., Liu C., Shum H. Y., Xy Y. Q., Zhang Z., "Automatic eyeglasses removal from face images", IEEE Transactions on Pattern Analysis and Machine Intelligence, vol. 26(3), 2004, pp. 322-336.*

Jing Z., Mariani R., Wang J., "Glasses detection for face recognition using bayes rules" Advances in Multimodal Interfaces-ICMI, Springer Berlin Heidelberg 2000, pp. 127-134.*

Wu H., Yoshikawa G., Shioyama T., Lao T., Kawade T, "Glasses frame detection with 3D Hough transform" IEEE 16th International Conference on Pattern Recognition Proceedings vol. 2, 2002, pp. 346-349.*

Park J. S., Oh Y. H., Ahn S. C., Lee S. W., "Glasses removal from facial image using recursive PCA reconstruction" Audio- and Video-Based Biometric Person Authentication, Springer Berlin Heidelberg 2003, pp. 369-376.*

Park J. S., Oh Y. H., Ahn S. C., Lee S. W., "Glasses removal from facial image using recursive error compensation" IEEE Transactions on Pattern Analysis and Machine Intelligence vol. 27(5), 2005, pp. 805-811.*

Tencent Technology, IPRP, PCT/CN2016/107178, dated May 29, 2018, 5 pgs.

Tencent Technology, ISRWO, PCT/CN2016/107178, dated Feb. 17, 2017, 6 pgs.

* cited by examiner

METHOD AND APPARATUS FOR DETECTING GLASSES IN A FACE IMAGE

RELATED APPLICATION

This application is a continuation-in-part of PCT Patent Application No. PCT/CN2016/107178, entitled "METHOD AND APPARATUS FOR DETECTING WEARING OF SPECTACLES IN FACIAL IMAGE" filed on Nov. 25, 2016, which claims priority to Chinese Patent Application No. 201510833176.X, filed with the State Intellectual Property Office of the People's Republic of China on Nov. 25, 2015, and entitled "METHOD AND APPARATUS FOR DETECTING GLASSES IN A FACE IMAGE", both of which are incorporated herein by reference in their entirety.

FIELD OF THE TECHNOLOGY

This application relates to the field of computer application technologies, and in particular, to a method and an apparatus for detecting glasses in a face image.

BACKGROUND OF THE DISCLOSURE

In the present age, with the rapid development of information, how to precisely authenticate an identity of a person has become an urgent social problem, especially in the fields of e-commerce and social security. Facial recognition has attracted increasing attention due to the advantages of being not forged, being not easily lost, and a high time validity.

At present, many people wear glasses. This causes significantly reduced accuracy of facial recognition. Therefore, before facial recognition is performed, a pair of glasses that is worn always needs to be detected to ensure high accuracy of facial recognition.

In an existing glasses detection method, a monitoring-based machine learning algorithm is usually used. That is, a large quantity of samples is collected to train a model and an input face image is compared with the trained model, to determine whether a pair of glasses is worn in a face image.

SUMMARY

Based on this, it is necessary to provide a method for detecting glasses in a face image that can reduce computational complexity and manpower costs.

In addition, it is also necessary to provide an apparatus for detecting glasses in a face image that can reduce computational complexity and manpower costs.

The technical solutions used in this application are as follows:

A method for detecting glasses in a face image is provided and includes: obtaining an input face image; detecting an image change in a nose bridge region in the face image to obtain an image change result of the nose bridge region; and performing an operation according to the image change result of the nose bridge region and obtaining a glasses detection result in the face image.

An apparatus for detecting glasses in a face image is provided and includes: a processor and a memory. The memory stores an instruction module capable of being executed by the processor, and the instruction module includes: an image obtaining module, configured to obtain an input face image; a result detection module, configured to detect an image change in a nose bridge region in the face image to obtain an image change result of the nose bridge region; and a result computation module, configured to perform an operation according to the image change result of the nose bridge region and obtain a glasses detection result in the face image.

A non-volatile computer storage medium is provided and stores a computer program. The computer program is used for: obtaining an input face image; detecting an image change in a nose bridge region in the face image to obtain an image change result of the nose bridge region; and performing an operation according to the image change result of the nose bridge region and obtaining a glasses detection result in the face image.

BRIEF DESCRIPTION OF THE DRAWINGS

To describe the technical solutions in the embodiments of this application more clearly, the following briefly describes the accompanying drawings required for describing the embodiments.

DESCRIPTION OF EMBODIMENTS

The embodiments of this application are described in detail in the following description. It should be understood that this application has various variations in different embodiments without dispatching from the scope of this application. The description and the accompanying drawings are considered to essentially illustrate this application, and are not intended to limit this application.

In an existing glasses detection method, because a large quantity of samples needs to be collected, a large amount of manpower is consumed. In addition, model training in the existing method also involves a complex computational process and parameter modulation.

To reduce computational complexity and manpower costs and to ensure high accuracy of facial recognition by using a simple and quick glasses detection method, the embodiments of this application provide a method for detecting glasses in a face image.

Figure 1:
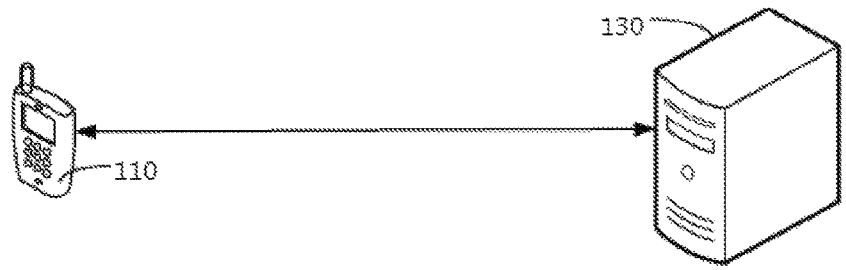
FIG. 1 is a schematic diagram of an application scenario of a method for detecting glasses in a face image according to an embodiment of this application.

In an embodiment, a method for detecting glasses in a face image is provided. A computer system in which the method runs is shown in FIG. 1. The computer system includes a terminal 110 and a server 130 interacting with the terminal 110.

The terminal 110 may be a smartphone, a tablet computer, a computer, a digital broadcast receiver, a PDA (personal digital assistant), a tablet computer, a PMP (portable multimedia player), a wearable device (such as a smart band or a smart watch), a navigation device, or the like. The terminal 110 obtains an input face image, and sends the input face image to the server 130, so that the server 130 detects glasses in the face image, facilitating subsequent facial recognition.

The server 130 detects an image change in a nose bridge region in the face image and further performs an operation, to obtain a glasses detection result in the face image, thereby determining whether a pair of glasses is worn in the face image.

Further, based on interaction between the terminal 110 and the server 130, the terminal 110 may further prompt, according to the wearing result returned by the server 130, a user to perform related processing, for example, removing the glasses.

Figure 2:
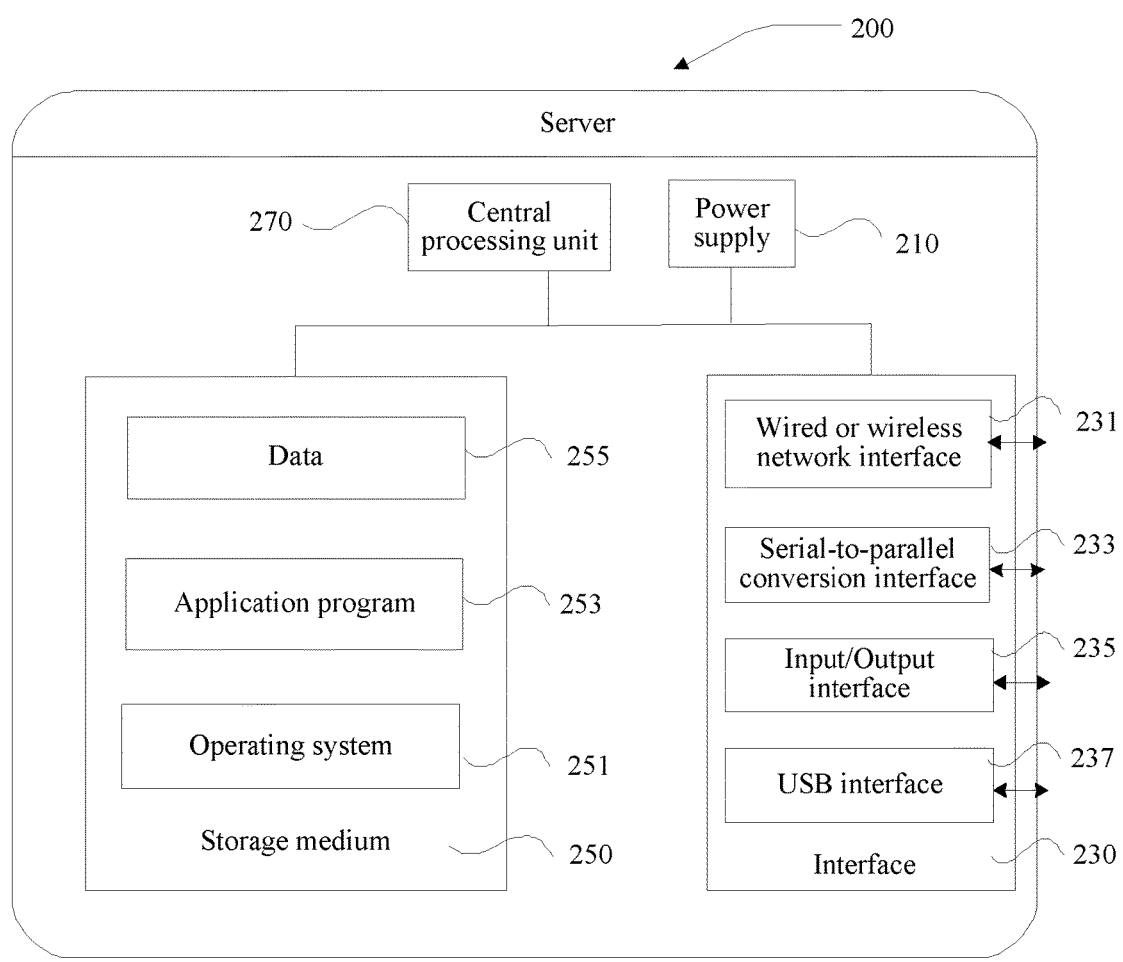
FIG. 2 is a schematic diagram of a hardware structure of a server according to an embodiment of this application.

Certainly, according to requirements in different application scenarios, for example, in an application scenario without network coverage, because the terminal 110 fails to interact with the server 130, related steps performed in the server 130 may be independently completed by the terminal 110. For example, glasses detection in the face image is implemented by presetting an off-line software development kit in the terminal 110. FIG. 2 is a schematic diagram of a hardware structure of a server 200 according to an embodiment of this application. The hardware structure is merely an example applicable to this application, and cannot be considered as any limitation on the usage scope of this application, or cannot be construed as that this application needs to rely on the server 200.

The server 200 may have great differences due to different configurations or performance. The server 200 includes a power supply 210, an interface 230, at least one storage medium 250, and at least one central processing unit (CPU, Central Processing Unit) 270.

The power supply 210 is configured to provide a working voltage for hardware devices on the server 200.

The interface 230 includes at least one wired or wireless network interface 231, at least one serial-to-parallel conversion interface 233, at least one input/output interface 235, at least one USB interface 237, and the like, and is configured to communicate with an external device.

The storage medium 250, as a carrier for storing resources, may be a random storage medium, a magnetic disk, an optical disc, or the like. The resources stored in the storage medium include an operating system 251, an application program 253, data 255, and the like. A storage manner may be transient storage or permanent storage. The operating system 251 is configured to manage and control the hardware devices on the server 200 and the application program 253, so that the central processing unit 270 can perform computation and processing on the massive data 255. The operating system 251 may be Windows Server™, Mac OS X™, Unix™, Linux™, FreeBSD™, or the like. The application program 253 is a computer program that completes at least one specified job based on the operating system 251, and may include at least one module (not shown in the figure). Each module may include a series of operation instructions for the server 200. The data 255 may be a picture, an image, or the like stored on a magnetic disk.

The central processing unit 270 may include one or more processors, and is configured to communicate with the storage medium 250 by using a bus, and perform an operation on and process the massive data 255 in the storage medium 250.

According to the foregoing detailed description, the server 200 applicable to this application detects glasses in the face image, that is, performs detection by reading, by using the central processing unit 270, a series of operating instructions stored in the storage medium 250, to determine whether a pair of glasses is worn in the face image.

It should be noted that, in another embodiment, if the related steps performed in the server 200 are all independently completed by a terminal, the hardware structure shown in FIG. 2 is also applicable to the terminal. The server 200 and the terminal 110 are collectively referred to as "computing device".

In addition, this application can also be implemented by using a hardware circuit or a combination of a hardware circuit and a software instruction. Therefore, implementation of this application is not limited to any specified hardware circuit, software, or a combination thereof.

Figure 3:
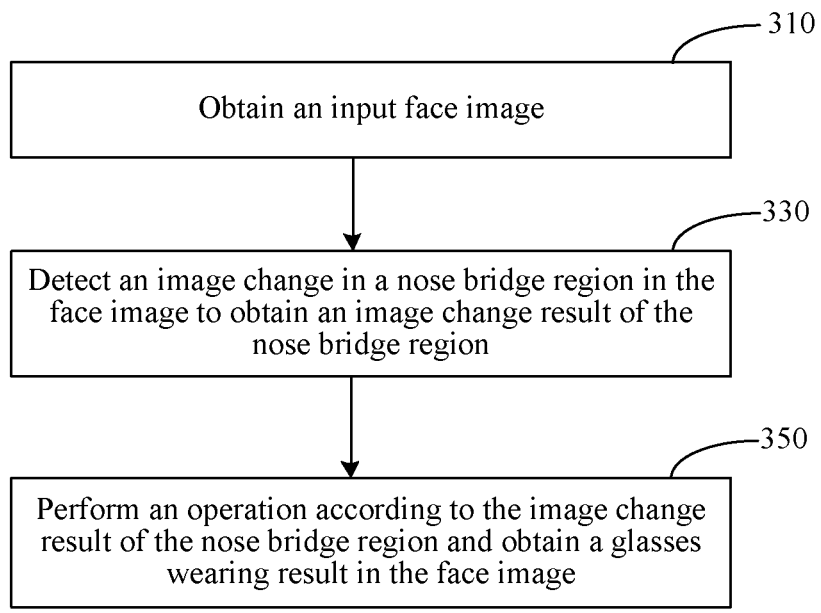
FIG. 3 is a flowchart of a method for detecting glasses in a face image according to an embodiment of this application.

Specifically, referring to FIG. 3, in an embodiment, a method for detecting glasses in a face image includes the following steps:

Step 310: Obtain an input face image.

The face image is an image only displaying a face. The face image may be input by scanning a picture and extracting the face image from the picture, or may be selected from pre-stored face images in a face image base, or may be obtained by directly taking a photo of a user's face.

After obtaining the input face image, whether a pair of glasses is worn in the face image may be detected, to facilitate subsequent facial recognition.

Step 330: Detect an image change in a nose bridge region in the face image to obtain an image change result of the nose bridge region.

In this embodiment, an image region of a face in the face image is defined as a face region. Image segmentation is further performed on the face region according to facial features, to obtain multiple image regions, such as an eye region, an eyebrow region, a mouth region, and a nose bridge region. The nose bridge region is specifically an image region between a right corner of the left eye and a left corner of the right eye in the face image. There may be various methods for face detection. For example, OpenCV (Open Source Computer Vision Library) provides some specific algorithms.

It may be understood that when being worn, a pair of glasses may generate reflected light in the exposure of natural light, infrared light, or other light. The reflected light may produce different impact on the nose bridge region during face imaging, and even the glasses shade the entire nose bridge region, leading to an image change in the nose bridge region.

Based on this, the image change result of the nose bridge region is obtained by detecting the image change in the nose bridge region in the face image. The image change result of the nose bridge region can reflect an image change situation of the nose bridge region, for example, whether the image change in the nose bridge region is uniform, so as to further determine, according to the image change result, whether a pair of glasses is worn in the face image.

Step 350: Perform an operation according to the image change result of the nose bridge region and obtain a glasses detection result in the face image.

As described above, the image change result of the nose bridge region reflects the image change situation of the nose bridge region. The image change situation merely represents an image change trend, for example, whether the image change in the nose bridge region is uniform. Therefore, an operation further needs to be performed on the image change result, to obtain the glasses detection result in the face image, and determine whether a pair of glasses is worn in the face image according to the obtained wearing result.

Through the above process, detection and a further operation can be performed according to an image change in a nose bridge region in a face image, and further whether a pair of glasses is worn in the face image can be determined, with no need to collect a large quantity of samples in advance to perform model training. This simple and quick method reduces computational complexity and manpower costs, and effectively eliminates a disadvantage in an existing glasses detection method.

Figure 4:
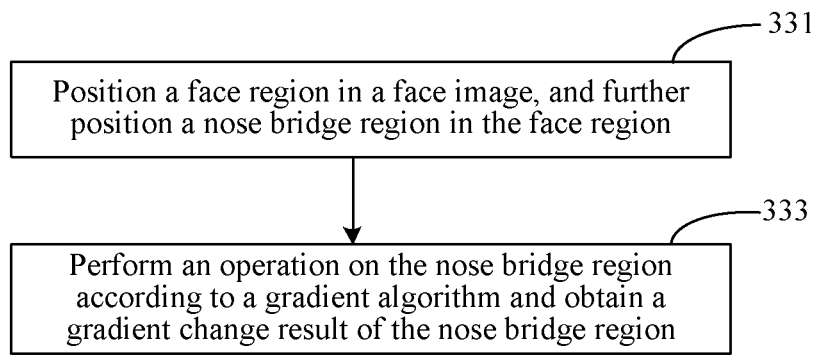
FIG. 4 is a flowchart of a method for detecting an image change in a nose bridge region in a face image in FIG. 3.

Referring to FIG. 4, in an embodiment, the image change is a gradient change.

In this embodiment, the image change is reflected by using a gradient change in a gray scale of a pixel in the image.

Further, step 330 includes the following steps:

Step 331: Position a face region in the face image, and further position the nose bridge region in the face region.

As described above, an image region of a face in the face image is defined as the face region, and the nose bridge region is obtained by performing image segmentation on the face region according to facial features. Therefore, to obtain the nose bridge region, twice positioning, that is, face region positioning and nose bridge region positioning, needs to be performed in the face image.

Step 333: Perform an operation on the nose bridge region according to a gradient algorithm and obtain a gradient change result of the nose bridge region.

After the nose bridge region is obtained, a gradient change in a gray scale of a pixel in the image is used for reflecting the image change. That is, a gradient change result of the nose bridge region is obtained by using a gradient algorithm according to a gray scale of a pixel in the nose bridge region in the face image. Further, whether a pair of glasses is worn in the face image is determined according to the gradient change result.

Figure 5:
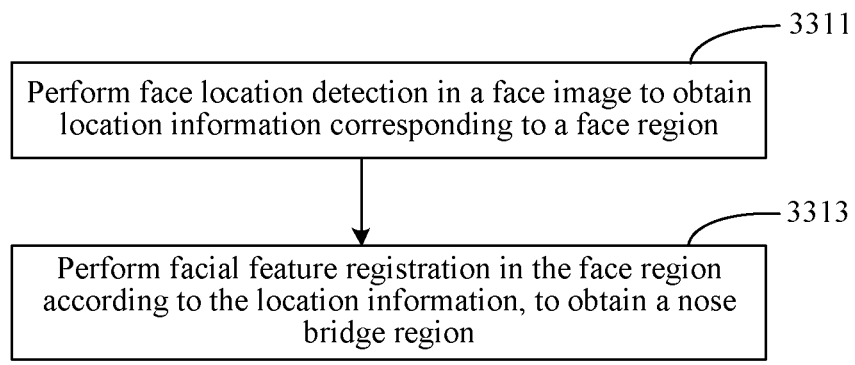
FIG. 5 is a flowchart of a method for positioning a face region in a face image, and further positioning a nose bridge region in the face region in FIG. 4.

Referring to FIG. 5, in an embodiment, step 331 includes the following steps:

Step 3311: Perform face location detection in the face image to obtain location information corresponding to the face region.

The face region is an image region of a face in the face image. To position the face region and obtain the location information corresponding to the face region, face location detection in the face image needs to be performed, thereby further positioning the nose bridge region in the positioned face region.

The location information corresponding to the face region is used for representing face location coordinates.

Step 3313: Perform facial feature registration in the face region according to the location information, to obtain the nose bridge region.

As described above, multiple image regions are obtained after image segmentation is performed on the face region according to facial features. Different image regions represent different facial features. For example, an eye region represents an eye, an eyebrow region represents an eyebrow.

The so-called facial feature registration refers to positioning the facial features, especially key parts such as a face, an eyebrow, an eye, a nose, and a mouth in the face region according to a facial feature registration algorithm. The facial feature registration algorithm includes, for example, an active shape model algorithm (ASM) and an explicit shape regression algorithm (ESR).

Based on this, after the location information corresponding to the face region is obtained, facial feature registration is performed in the face region according to the location information, to obtain image regions of key parts in the face region, including the nose bridge region.

Specifically, facial feature registration is performed on the face region according to the location information, to obtain that coordinates of a right corner of the left eye are $L(x_1, y_1)$, and that coordinates of a left corner of the right eye are $R(x_2, y_2)$. In this case, an image region between L and R is the nose bridge region.

Figure 6:
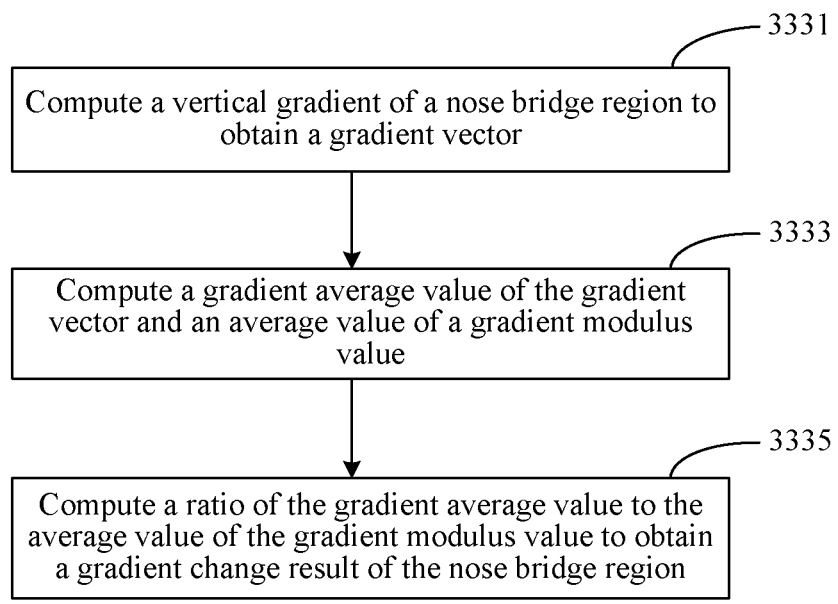
FIG. 6 is a flowchart of a method for performing computation on a nose bridge region according to a gradient algorithm in FIG. 4.

Referring to FIG. 6, in an embodiment, step 333 includes the following steps:

Step 3331: Compute a vertical gradient of the nose bridge region in a vertical direction to obtain a gradient vector.

Specifically, the nose bridge region is an image region between the coordinates $L(x_1, y_1)$ of the right corner of the left eye and the coordinates $R(x_2, y_2)$ of the left corner of the right eye. The length of the nose bridge region is $d=|x_2-x_1|$, and the width of the nose bridge region is the width of eyes in a vertical direction, for example, n pixels. The coordinates $L(x_1, y_1)$ and $R(x_2, y_2)$ are computed by using the bottom-left corner of the image as an origin. The width of the eyes in the vertical direction is, for example, a half of the length of the eyes in a horizontal direction. A vertical gradient of a gray scale of a pixel in the nose bridge region is computed, to obtain a gradient vector $w=\{w_1, w_2, \ldots, w_n\}$ in the length of n.

A digital image is a discrete point spectrum, and is also referred to as a two-dimensional discrete function. A gradient of the image is a derivation of the two-dimensional discrete function, and a derivation operation is to compute a difference between two adjacent pixels in a horizontal direction or a vertical direction. In this embodiment of this application, a derivation in a vertical direction is used as an example.

Gradients are $w_1=I(i, j-1)-I(i, j), \ldots$, and $w_n=I(i, j-n)-I(i, j)$ respectively, where I is a grayscale value of a pixel in the image, and (i, j) are coordinates of a starting pixel. In this embodiment, the gradient of the pixel in the nose bridge region can be computed downward or upward in the vertical direction. The starting pixel may be an uppermost or a lowermost pixel in the center column of the nose bridge region, or a pixel adjacent to the center, or a pixel in the upper left, lower left, upper right, or lower right of the nose bridge region.

Step 3333: Compute a gradient average value of the gradient vector and an average value of a gradient modulus value.

Specifically, the gradient average value of the gradient vector and the average value of the gradient modulus value are computed by using formulas $$u = \frac{1}{n}\sum w_i \text{ and } s = \frac{1}{n}\sum |w_i|,$$

where u is the gradient average value, and s is the average value of the gradient modulus value.

Step 3335: Compute a ratio of the gradient average value to the average value of the gradient modulus value to obtain the gradient change result of the nose bridge region.

Specifically, the gradient average value is $$u = \frac{1}{n}\sum w_i,$$

the average value of the gradient modulus value is $$s = \frac{1}{n}\sum |w_i|,$$

and the ratio of the gradient average value to the average value of the gradient modulus value is u/s. Therefore, u/s is the gradient change result of the nose bridge region. The gradient change result is obtained according to a gradient change in image distribution, and reflects whether the image change in the nose bridge region is uniform.

In an embodiment, step 350 includes:

comparing the image change result with a preset threshold, and obtaining the glasses detection result in the face image by means of determining according to the obtained comparison result. For example, when u/s is less than the preset threshold, it is determined that a pair of glasses is worn in the face image. If u/s is greater than the preset threshold, it is determined that no glasses are worn in the face image.

In an embodiment, comparison between an image change result and the preset threshold is performed on each of multiple columns of pixels in a vertical direction in the nose bridge region. If an image change of each column of pixels is greater than the preset threshold, it is determined that no glasses are worn. If an image change of at least one column of pixels is less than the preset threshold, it is determined that a pair of glasses is worn. Selection and computation are performed alternately towards both sides from the central pixel column of the nose bridge region, or may be performed from both sides to the central pixel column. In an embodiment, if it is determined that no glasses are worn in the face image, the nose bridge region may be vertically enlarged in a particular proportion.

Because the image change result of the nose bridge region reflects the image change trend, only an image change generated in the nose bridge region that is between the eyes is relatively obvious, and changes in the other regions are not obvious.

Therefore, to avoid a false determining caused by a less obvious image change generated in the nose bridge region, in a process of detecting an image change in the nose bridge region in the face image, a threshold is specified in advance, so as to determine whether a pair of glasses is worn in the face image by using a comparison result obtained by comparing the image change result with the preset threshold, thereby improving an accuracy rate of the determined glasses result.

In an embodiment, the preset threshold is 0.8, the gradient average value is $$u = \frac{1}{n}\sum w_i,$$

the average value of the gradient modulus value is $$s = \frac{1}{n}\sum |w_i|,$$

and the gradient change result of the nose bridge region is u/s.

Comparison is performed between u/s and 0.8. If a comparison result is that u/s is less than 0.8, it indicates that an image change in the nose bridge region in the face image is not uniform, and it is further determined that a pair of glasses is worn in the face image. Otherwise, it indicates that the image change in the nose bridge region in the face image is uniform, and it is further determined that no glasses are worn in the face image.

Figure 7:
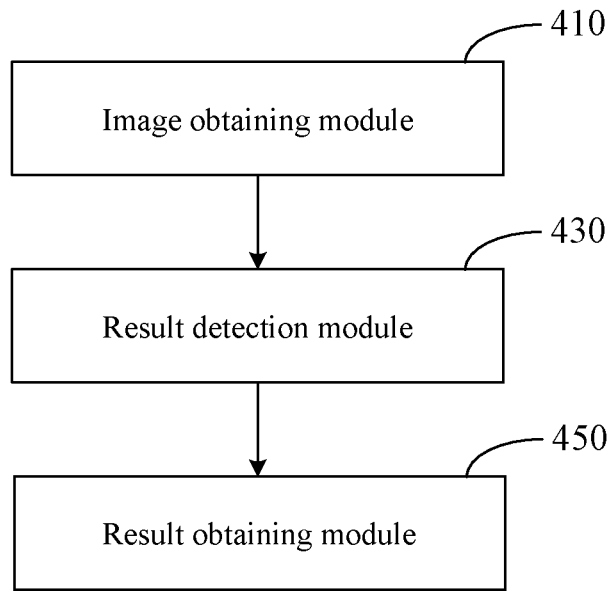
FIG. 7 is a structural block diagram of an apparatus for detecting glasses in a face image according to an embodiment of this application.

Referring to FIG. 7, in an embodiment, an apparatus for detecting glasses in a face image includes an image obtaining module 410, a result detection module 430, and a result obtaining module 450.

The image obtaining module 410 is configured to obtain an input face image.

The face image is an image only displaying a face. The face image may be input by scanning a picture and extracting the face image from the picture, or may be selected from pre-stored face images in a face image base, or may be obtained by directly taking a photo of a user's face.

After obtaining the input face image, whether a pair of glasses is worn in the face image may be detected, to facilitate subsequent facial recognition.

The result detection module 430 is configured to detect an image change in a nose bridge region in the face image to obtain an image change result of the nose bridge region.

In this embodiment, an image region of a face in the face image is defined as a face region. Image segmentation is further performed on the face region according to facial features, to obtain multiple image regions, such as an eye region, an eyebrow region, a mouth region, and a nose bridge region. The nose bridge region is specifically an image region between a right corner of the left eye and a left corner of the right eye in the face image. There may be various methods for face detection. For example, OpenCV (Open Source Computer Vision Library) provides some specific algorithms.

It may be understood that when being worn, a pair of glasses may generate reflected light in the exposure of natural light, infrared light, or other light. The reflected light may produce different impact on the nose bridge region during face imaging, and even the glasses shade the entire nose bridge region, leading to an image change in the nose bridge region.

Based on this, the image change result of the nose bridge region is obtained by detecting the image change in the nose bridge region in the face image. The image change result of the nose bridge region can reflect an image change situation of the nose bridge region, for example, whether the image change in the nose bridge region is uniform, so as to further determine, according to the image change result, whether a pair of glasses is worn in the face image.

The result obtaining module 450 is configured to perform an operation according to the image change result of the nose bridge region and obtain a glasses detection result in the face image.

As described above, the image change result of the nose bridge region reflects the image change situation of the nose bridge region. The image change situation merely represents an image change trend, for example, whether the image change in the nose bridge region is uniform. Therefore, an operation further needs to be performed on the image change result to obtain the glasses detection result in the face image, and determine whether a pair of glasses is worn in the face image according to the obtained wearing result.

Through the above process, detection and a further operation can be performed according to an image change in a nose bridge region in a face image, and further whether a pair of glasses is worn in the face image can be determined, with no need to collect a large quantity of samples in advance to perform model training. This simple and quick method reduces computational complexity and manpower costs, and effectively eliminates a disadvantage in an existing glasses detection method.

Figure 8:
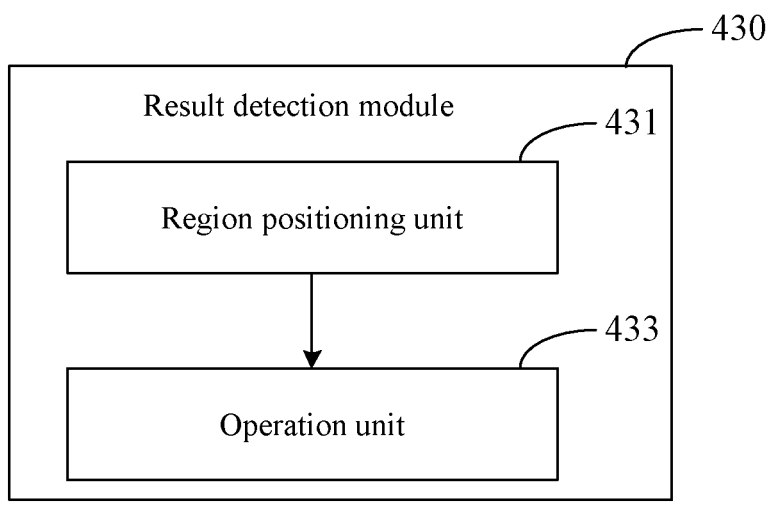
FIG. 8 is a structural block diagram of a result detection module in FIG. 7.

Referring to FIG. 8, in an embodiment, the image change is a gradient change in a gray scale of a pixel in an image. The result detection module 430 includes a region positioning unit 431 and an operation unit 433.

The region positioning unit 431 is configured to position a face region in the face image, and further position the nose bridge region in the face region.

As described above, an image region of a face in the face image is defined as the face region, and the nose bridge region is obtained by performing image segmentation on the face region according to facial features. Therefore, to obtain the nose bridge region, twice positioning, that is, face region positioning and nose bridge region positioning, needs to be performed in the face image.

The operation unit 433 is configured to perform an operation on the nose bridge region according to a gradient algorithm and obtains a gradient change result of the nose bridge region.

After the nose bridge region is obtained, a gradient change in a gray scale of a pixel in the image is used for reflecting the image change. That is, a gradient change result of the nose bridge region is obtained by using a gradient algorithm according to a gray scale of a pixel in the nose bridge region in the face image. Further, whether a pair of glasses is worn in the face image is determined according to the gradient change result.

Figure 9:
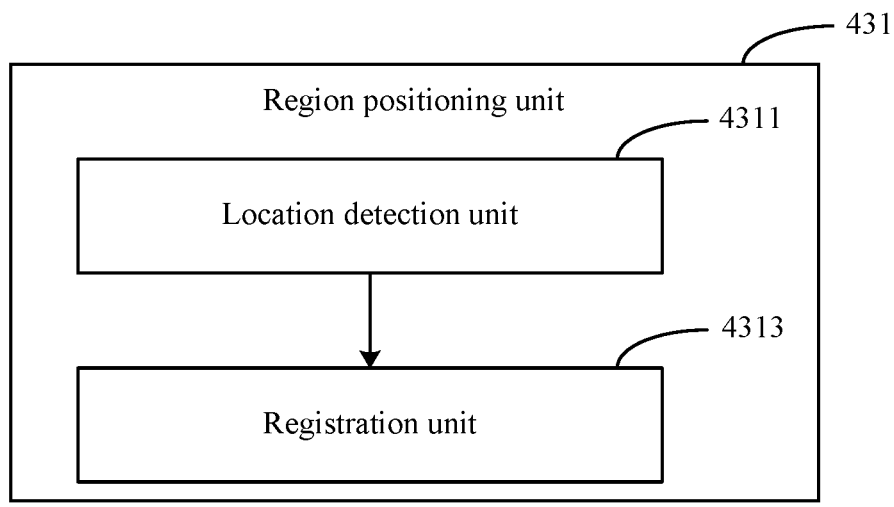
FIG. 9 is a structural block diagram of a region positioning unit in FIG. 8.

Referring to FIG. 9, in an embodiment, the region positioning unit 431 includes a location detection unit 4311 and a registration unit 4313.

The location detection unit 4311 is configured to perform face location detection in the face image to obtain location information corresponding to the face region.

The face region is an image region of a face in the face image. To position the face region and obtain the location information corresponding to the face region, face location detection in the face image needs to be performed, thereby further positioning the nose bridge region in the positioned face region.

The location information corresponding to the face region is used for representing face location coordinates.

The registration unit 4313 is configured to perform facial feature registration in the face region according to the location information, to obtain the nose bridge region.

As described above, multiple image regions are obtained after image segmentation is performed on the face region according to facial features. Different image regions represent different facial features. For example, an eye region represents an eye, an eyebrow region represents an eyebrow.

The so-called facial feature registration refers to positioning the facial features, especially key parts such as a face, an eyebrow, an eye, a nose, and a mouth in the face region according to a facial feature registration algorithm. The facial feature registration algorithm includes, for example, an active shape model algorithm (ASM) and an explicit shape regression algorithm (ESR).

Based on this, after the location information corresponding to the face region is obtained, facial feature registration is performed in the face region according to the location information, to obtain image regions of key parts in the face region, including the nose bridge region.

Specifically, facial feature registration is performed on the face region according to the location information, to obtain that coordinates of a right corner of the left eye are $L(x_1, y_1)$, and that coordinates of a left corner of the right eye are $R(x_2, y_2)$. In this case, an image region between L and R is the nose bridge region.

Figure 10:
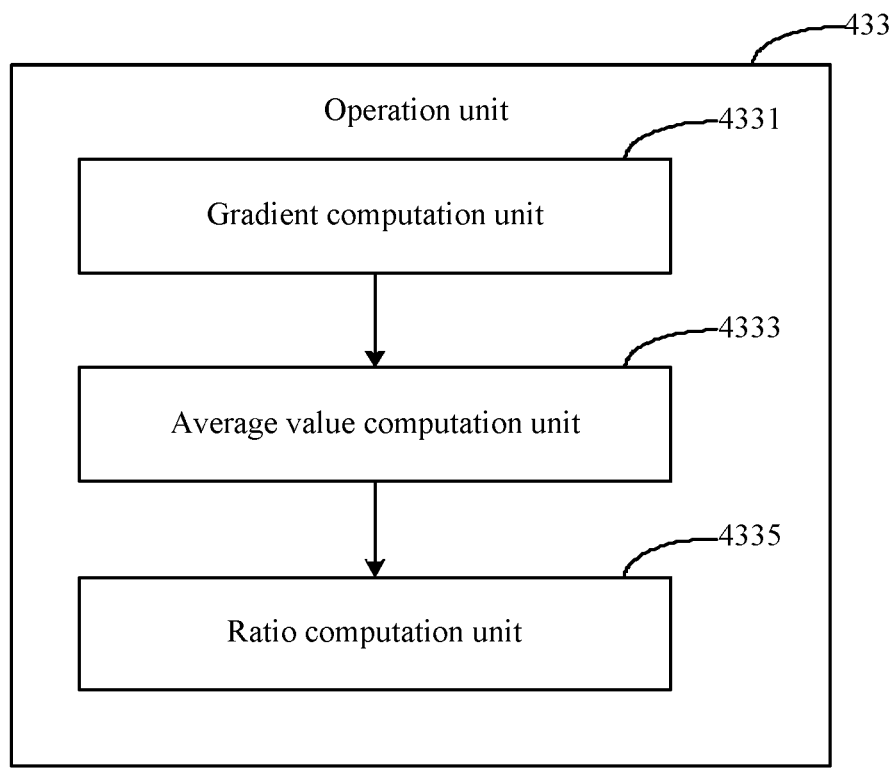
FIG. 10 is a structural block diagram of a computation unit in FIG. 8.

Referring to FIG. 10, in an embodiment, the operation unit 433 includes a gradient computation unit 4331, an average value computation unit 4333, and a ratio computation unit 4335.

The gradient computation unit 4331 is configured to compute a vertical gradient of the nose bridge region in a vertical direction to obtain a gradient vector.

Specifically, the nose bridge region is an image region between the coordinates $L(x_1, y_1)$ of the right corner of the left eye and the coordinates $R(x_2, y_2)$ of the left corner of the right eye. The length of the nose bridge region is $d=|x_2-x_1|$, and the width of the nose bridge region is the width of eyes in a vertical direction, for example, n pixels. The coordinates $L(x_1, y_1)$ and $R(x_2, y_2)$ are computed by using the bottom-left corner of the image as an origin. The width of the eyes in the vertical direction is, for example, a half of the length of the eyes in a horizontal direction. A vertical gradient of a gray scale of a pixel in the nose bridge region is computed, to obtain a gradient vector $w=\{w_1, w_2, \ldots, w_n\}$ in the length of n.

A digital image is a discrete point spectrum, and is also referred to as a two-dimensional discrete function. A gradient of the image is a derivation of the two-dimensional discrete function, and a derivation operation is to compute a difference between two adjacent pixels in a horizontal direction or a vertical direction. In this embodiment of this application, a derivation in a vertical direction is used as an example.

Gradients are $w_1=I(i, j-1)-I(i,j), \ldots$, and $w_n=I(i, j-n)-I(i, j)$ respectively, where I is a grayscale value of a pixel in the image, and (i,j) are coordinates of a starting pixel. In this embodiment, the gradient of the pixel in the nose bridge region can be computed downward or upward in the vertical direction. The starting pixel may be an uppermost or a lowermost pixel in the center column of the nose bridge region, or a pixel adjacent to the center, or a pixel in the upper left, lower left, upper right, or lower right of the nose bridge region.

The average value computation unit 4333 is configured to compute a gradient average value of the gradient vector and an average value of a gradient modulus value.

Specifically, the gradient average value of the gradient vector and the average value of the gradient modulus value are computed by using formulas $$u = \frac{1}{n}\sum w_i \text{ and } s = \frac{1}{n}\sum |w_i|,$$

where u is the gradient average value, and s is the average value of the gradient modulus value.

The ratio computation unit 4335 is configured to compute a ratio of the gradient average value to the average value of the gradient modulus value to obtain the gradient change result of the nose bridge region.

Specifically, the gradient average value is $$u = \frac{1}{n} \sum w_i,$$

the average value of the gradient modulus value is $$s = \frac{1}{n} \sum |w_i|,$$

and the ratio of the gradient average value to the average value of the gradient modulus value is u/s. Therefore, u/s is the gradient change result of the nose bridge region. The gradient change result is obtained according to a gradient change in image distribution, and reflects whether the image change in the nose bridge region is uniform.

In an embodiment, the result computation module 450 includes a comparison unit, configured to: compare the image change result with a preset threshold, and obtain the glasses detection result in the face image by means of determining according to the obtained comparison result. For example, when u/s is less than the preset threshold, it is determined that a pair of glasses worn in the face image. If u/s is greater than the preset threshold, it is determined that no glasses are worn in the face image.

In an embodiment, comparison between an image change result and the preset threshold is performed on each of multiple columns of pixels in a vertical direction in the nose bridge region. If an image change of each column of pixels is greater than the preset threshold, it is determined that no glasses are worn. If an image change of at least one column of pixels is less than the preset threshold, it is determined that a pair of glasses is worn. Selection and computation are performed alternately towards both sides from the central pixel column of the nose bridge region, or may be performed from both sides to the central pixel column.

In an embodiment, if it is determined that no glasses are worn in the face image, the nose bridge region may be vertically enlarged in a particular proportion.

Because the image change result of the nose bridge region reflects the image change trend, only an image change generated in the nose bridge region that is between the eyes is relatively obvious, and changes in the other regions are not obvious.

Therefore, to avoid a false determining caused by a less obvious image change generated in the nose bridge region, in a process of detecting an image change in the nose bridge region in the face image, a threshold is specified in advance, so as to determine whether a pair of glasses is worn in the face image by using a comparison result obtained by comparing the image change result with the preset threshold, thereby improving an accuracy rate of the determined glasses result.

In an embodiment, the preset threshold is 0.8, the gradient average value is $$u = \frac{1}{n} \sum w_i,$$

the average value of the gradient modulus value is $$s = \frac{1}{n} \sum |w_i|,$$

and the gradient change result of the nose bridge region is u/s.

Comparison is performed between u/s and 0.8. If a comparison result is that u/s is less than 0.8, it indicates that an image change in the nose bridge region in the face image is not uniform, and it is further determined that a pair of glasses is worn in the face image. Otherwise, it indicates that the image change in the nose bridge region in the face image is uniform, and it is further determined that no glasses are worn in the face image.

This application is described with reference to the flowcharts and/or block diagrams of the method, the device (system), and the computer program product according to the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or another programmable device provides steps for implementing a specific function in one or more processes in the flowcharts and/or in one or more blocks in the block diagrams.

In addition, various function modules in the embodiments of the present application may be integrated into one processing unit, or each of the modules may exist alone physically, or two or more modules may be integrated into one unit. The integrated unit may be implemented in a form of hardware, or may be implemented in a form of a software function unit. The function modules in the embodiments may be located on one terminal or network node, or may be distributed on multiple terminals or network nodes.

In addition, each embodiment of this application may be implemented by a data processing program executed by a data processing device such as a computer. Apparently, the data processing program constitutes this application. In addition, generally, a data processing program stored in a non-transitory computer readable storage medium is directly read from the storage medium for execution or the program is installed on or replicated to a storage device (such as a hard disk or memory) of a data processing device for execution. Therefore, such a storage medium also constitutes this application. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

The foregoing descriptions are merely preferable embodiments of this application, and are not intended to limit the embodiments of this application. A person of ordinary skill in the art can make corresponding modifications and variations with ease without departing from the spirit and scope of the embodiments of this application. Therefore, the protection scope of this application shall be subject to the protection scope of the claims.

What is claimed is:

1. A method for detecting glasses in a face image performed at a computing device having one or more processors and memory storing one or more programs to be executed by the one or more processors, the method comprising:

obtaining a face image;

determining a nose bridge region, a left eye, and a right eye in the face image;

detecting an image change in the nose bridge region to obtain an image change result of the nose bridge region, wherein the image change is a gradient change in a gray scale of a pixel in the face image, further comprising:

designating first coordinates corresponding to a right corner of the left eye as $L(x_1, y_1)$;

designating second coordinates corresponding to a left corner of the right eye as $R(x_2, y_2)$;

determining a length of the nose bridge region by taking a difference between the horizontal components of the first and second coordinates;

determining a width of the nose bridge region based on a width of the eyes;

designating the width of the nose bridge region as n pixels, wherein n is an integer;

computing a vertical gradient per pixel, $w_i$, along the width of the nose bridge region to obtain a gradient vector w in the length of n, wherein i is an integer having values from one to n and $w=\{w_1, w_2, \ldots, w_n\}$;

computing an average gradient value, u, of the gradient vector w, wherein $$u = \frac{1}{n}\sum w_i;$$

computing an average value, s, of a gradient modulus value; wherein $$s = \frac{1}{n}\sum |w_i|;$$

and computing a ratio of the average gradient value, u, to the average value of the gradient modulus value, s, to obtain the gradient change of the nose bridge region;

in accordance with a determination that that the computed ratio is less than a predetermined threshold, determining that a pair of glasses is worn on the face image; and in accordance with a determination that that the computed ratio exceeds the predetermined threshold, determining that no glasses are worn on the face image.

2. The method according to claim 1, wherein detecting an image change in the nose bridge region to obtain an image change result of the nose bridge region comprises:

determining a face region in the face image, and positioning the nose bridge region in the face region.

3. The method according to claim 2, wherein determining the face region in the face image, and positioning the nose bridge region in the face region comprises:

performing face location detection in the face image to obtain location information corresponding to the face region; and performing facial feature registration in the face region according to the location information, to obtain the nose bridge region.

4. A terminal for detecting glasses in a face image, comprising:

one or more processors;

memory; and a plurality of programs stored in the memory, wherein the plurality of programs, when executed by the one or more processors, cause the terminal to perform a plurality of operations including:

obtaining a face image;

determining a nose bridge region, a left eye, and a right eye in the face image;

detecting an image change in the nose bridge region to obtain an image change result of the nose bridge region, wherein the image change is a gradient change in a gray scale of a pixel in the face image, further comprising:

designating first coordinates corresponding to a right corner of the left eye as $L(x_1, y_1)$;

designating second coordinates corresponding to a left corner of the right eye as $R(x_2, y_2)$;

determining a length of the nose bridge region by taking a difference between the horizontal components of the first and second coordinates;

determining a width of the nose bridge region based on a width of the eyes;

designating the width of the nose bridge region as n pixels, wherein n is an integer;

computing a vertical gradient per pixel, $w_i$, along the width of the nose bridge region to obtain a gradient vector w in the length of n, wherein i is an integer having values from one to n and $w=\{w_1, w_2, \ldots, w_n\}$;

computing an average gradient value, u, of the gradient vector w, wherein $$u = \frac{1}{n}\sum w_i;$$

computing an average value, s, of a gradient modulus value; wherein $$s = \frac{1}{n}\sum |w_i|;$$

and computing a ratio of the average gradient value, u, to the average value of the gradient modulus value, s, to obtain the gradient change of the nose bridge region;

in accordance with a determination that that the computed ratio is less than a predetermined threshold, determining that a pair of glasses is worn on the face image; and in accordance with a determination that that the computed ratio exceeds the predetermined threshold, determining that no glasses are worn on the face image.

5. The terminal according to claim 4, wherein the plurality of operations comprises:

determining a face region in the face image, and positioning the nose bridge region in the face region.

6. The terminal according to claim 5, wherein determining the face region in the face image, and positioning the nose bridge region in the face region comprises:

performing face location detection in the face image to obtain location information corresponding to the face region; and performing facial feature registration in the face region according to the location information, to obtain the nose bridge region.

7. A non-transitory computer storage medium in connection with a terminal having one or more processors, storing a plurality of programs, wherein the plurality of programs, when executed by the one or more processors, cause the terminal to perform a plurality of operations including:

obtaining a face image;

determining a nose bridge region, a left eye, and a right eye in the face image;

detecting an image change in the nose bridge region to obtain an image change result of the nose bridge region, wherein the image change is a gradient change in a gray scale of a pixel in the face image, further comprising:

designating first coordinates corresponding to a right corner of the left eye as $L(x_1, y_1)$;

designating second coordinates corresponding to a left corner of the right eye as $R(x_2, y_2)$;

determining a length of the nose bridge region by taking a difference between the horizontal components of the first and second coordinates;

determining a width of the nose bridge region based on a width of the eyes;

designating the width of the nose bridge region as n pixels, wherein n is an integer;

computing a vertical gradient per pixel, $w_i$, along the width of the nose bridge region to obtain a gradient vector w in the length of n, wherein i is an integer having values from one to n and $w=\{w_1, w_2, \ldots, w_n\}$;

computing an average gradient value, u, of the gradient vector w, wherein $$u = \frac{1}{n}\sum w_i;$$

computing an average value, s, of a gradient modulus value; wherein $$s = \frac{1}{n}\sum |w_i|;$$

and computing a ratio of the average gradient value, u, to the average value of the gradient modulus value, s, to obtain the gradient change of the nose bridge region;

in accordance with a determination that that the computed ratio is less than a predetermined threshold, determining that a pair of glasses is worn on the face image; and in accordance with a determination that that the computed ratio exceeds the predetermined threshold, determining that no glasses are worn on the face image.

8. The non-transitory computer storage medium according to claim 7, wherein detecting an image change in the nose bridge region to obtain an image change result of the nose bridge region comprises:

determining a face region in the face image, and positioning the nose bridge region in the face region.

9. The non-transitory computer storage medium according to claim 8, wherein determining the face region in the face image, and positioning the nose bridge region in the face region comprises:

performing face location detection in the face image to obtain location information corresponding to the face region; and performing facial feature registration in the face region according to the location information, to obtain the nose bridge region.

* * * * *